(12) United States Patent
Kato et al.

(10) Patent No.: US 9,593,750 B2
(45) Date of Patent: Mar. 14, 2017

(54) CHAIN GUIDE AND CHAIN TRANSMISSION DEVICE

(75) Inventors: Akio Kato, Iwata (JP); Shinji Oishi, Iwata (JP)

(73) Assignee: NTN CORPORATION, Osaka (JP)

( * ) Notice: Subject to any disclaimer, the term of this patent is extended or adjusted under 35 U.S.C. 154(b) by 97 days.

(21) Appl. No.: 14/234,418

(22) PCT Filed: Jul. 13, 2012

(86) PCT No.: PCT/JP2012/067932
§ 371 (c)(1),
(2), (4) Date: Feb. 12, 2014

(87) PCT Pub. No.: WO2013/015138
PCT Pub. Date: Jan. 31, 2013

(65) Prior Publication Data
US 2014/0155209 A1    Jun. 5, 2014

(30) Foreign Application Priority Data

Jul. 25, 2011    (JP) .................................. 2011-161822

(51) Int. Cl.
*F16H 7/12*    (2006.01)
*F16H 7/20*    (2006.01)
(Continued)

(52) U.S. Cl.
CPC .............. *F16H 7/20* (2013.01); *F16C 13/006* (2013.01); *F16C 33/588* (2013.01);
(Continued)

(58) Field of Classification Search
CPC ........... F16H 2007/0874; F16H 7/1281; F16H 2007/081; F16H 7/1254; F16H 2007/0806
(Continued)

(56) References Cited

U.S. PATENT DOCUMENTS 4,981,116 A * 1/1991 Trinquard .................. 123/90.31
2004/0247216 A1 * 12/2004 Ichikawa et al. ............ 384/546
(Continued)

FOREIGN PATENT DOCUMENTS

JP    2010-180900    8/2010
JP    2011-047473    3/2011
(Continued)

OTHER PUBLICATIONS

European Search Report issued Mar. 6, 2015 in corresponding European Patent Application No. 12817594.0.
(Continued)

*Primary Examiner* — Henry Liu
(74) *Attorney, Agent, or Firm* — Wenderoth, Lind & Ponack, L.L.P.

(57) ABSTRACT

A chain guide includes a plurality of roller shafts provided on one side of a timing chain for torque transmission and spaced from each other in the longitudinal direction of a guide base facing the timing chain. The respective roller shafts rotatably support chain guiding rollers in the form of needle roller bearings. The rollers are cylindrical members having the same diameter over the entire axial direction such that the rollers are movable in the axial direction relative to the timing chain. The rollers are supported so as to be movable in the axial direction. When the rollers and the timing chain move relative to each other in the axial direction and the rollers move relative to the roller shafts in the axial direction, contact portions between the rollers and the roller shafts are displaced in the axial direction, so that radial loads are not locally applied.

7 Claims, 8 Drawing Sheets

(51) Int. Cl.
 F16H 7/08 (2006.01)
 F16C 13/00 (2006.01)
 F16C 33/58 (2006.01)
(52) U.S. Cl.
 CPC ...... *F16C 2240/60* (2013.01); *F16C 2361/63* (2013.01); *F16H 7/1281* (2013.01); *F16H 2007/0865* (2013.01); *F16H 2007/0893* (2013.01)
(58) Field of Classification Search
 USPC .......................................................... 474/134
 See application file for complete search history.

(56) References Cited

U.S. PATENT DOCUMENTS

| 2006/0067597 | A1* | 3/2006 | Oishi | 384/572 |
| 2007/0154127 | A1* | 7/2007 | Oishi et al. | 384/569 |
| 2011/0006597 | A1* | 1/2011 | Diekevers et al. | 305/137 |
| 2011/0088506 | A1* | 4/2011 | Oishi et al. | 74/569 |
| 2011/0294612 | A1* | 12/2011 | Kato | 474/91 |
| 2011/0294613 | A1* | 12/2011 | Fuhrmann et al. | 474/111 |
| 2012/0048427 | A1* | 3/2012 | Kubota | 148/218 |
| 2012/0118434 | A1* | 5/2012 | Konishi et al. | 148/218 |

FOREIGN PATENT DOCUMENTS

| JP | 2011-58552 | 3/2011 | |
| JP | 2011-89553 | 5/2011 | |
| WO | 2010/090139 | 8/2010 | |
| WO | WO 2010090139 A1 * | 8/2010 | F16H 7/08 |

OTHER PUBLICATIONS

International Search Report issued Oct. 9, 2012 in International (PCT) Application No. PCT/JP2012/067932.

Written Opinion of the International Searching Authority issued Oct. 9, 2012 in International (PCT) Application No. PCT/JP2012/067932.

\* cited by examiner

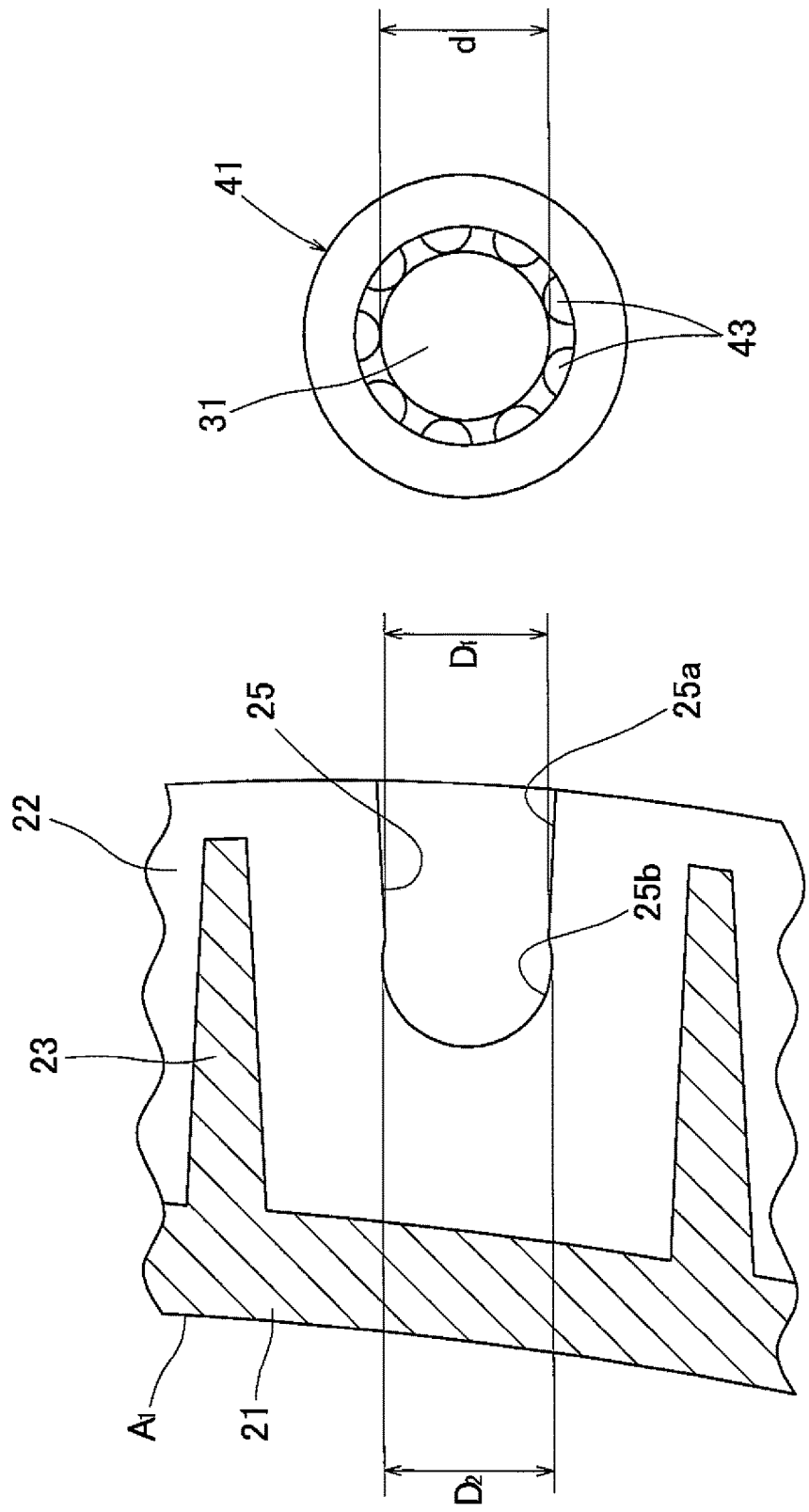

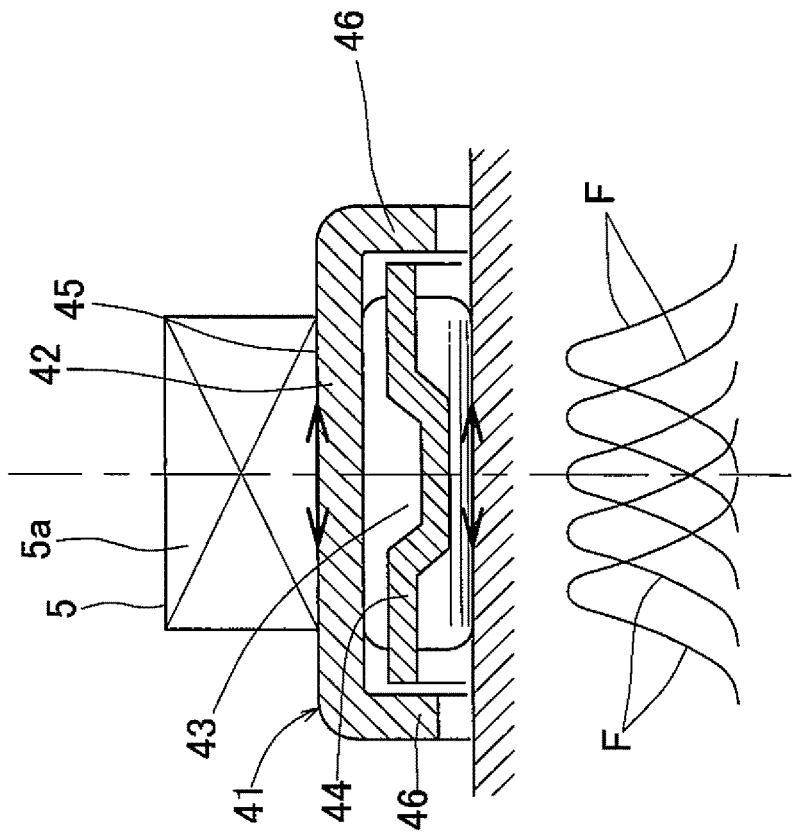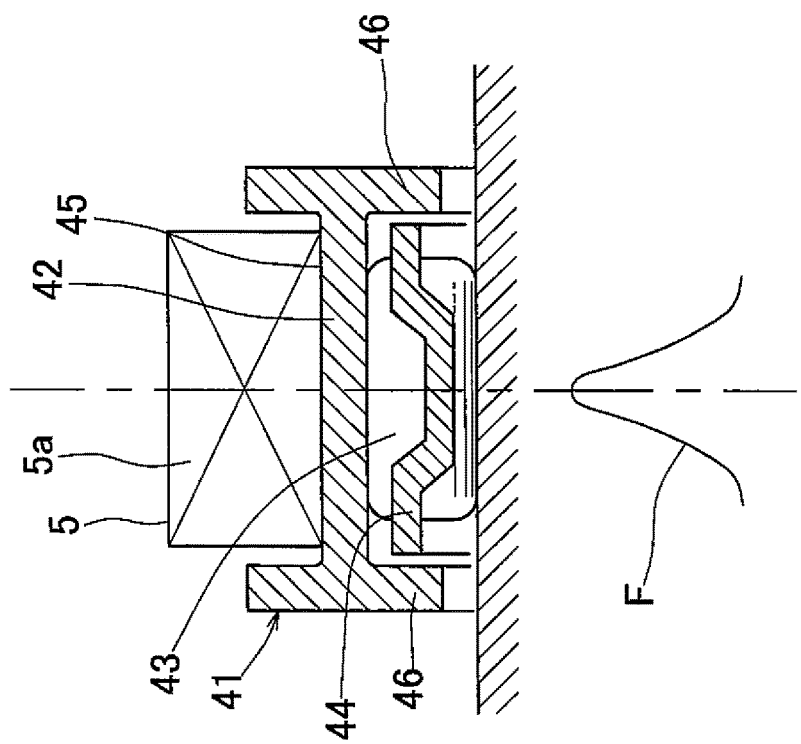

CHAIN GUIDE AND CHAIN TRANSMISSION DEVICE

TECHNICAL FIELD

The present invention relates to a chain guide used for adjusting the tension of a chain or for guiding movements of the chain, and a chain transmission device including the chain guide.

BACKGROUND ART

In a chain transmission device for driving a camshaft in which a timing chain is looped over a driving sprocket attached to a crankshaft and a driven sprocket attached to the camshaft, a pivotable chain guide is provided on one side of the slack side of the timing chain, and adjustment force of a chain tensioner is applied to a remote end of the chain guide remote from the center of pivoting movement of the chain guide to tighten the timing chain, so that the chain is prevented from becoming slack and flapping.

Another chain guide is fixed to the tight side of the timing chain, and movements of the timing chain are guided by the fixed chain guide.

One known chain guide for adjusting the tension and for guiding the movement of the timing chain is configured to guide the timing chain by sliding contact with its surface. However, this chain guide has a problem in that the movement resistance of the timing chain is large and a transmission torque loss is significant.

In order to solve this problem, International Publication No. 2010/090139 proposes a chain guide in which both ends of a plurality of roller shafts arranged in a curve form are supported by a guide base elongated in the moving direction of a timing chain, rollers in the form of roller bearings are rotatably supported on the respective roller shafts, and the timing chain is movably supported by the plurality of rollers.

In the above chain guide, since the timing chain is guided while being in rolling contact with the plurality of rollers, movement resistance of the timing chain is small and a transmission torque loss is insignificant.

In the chain guide described in International Publication No. 2010/090139, since the rollers in the form of roller bearings are supported so as not to be movable in the axial direction and the rollers always face the timing chain at the same axial position, radial loads applied to the rollers from the timing chain always act on circumferential portions of the roller shafts from rolling elements of the roller bearings forming the rollers. As a result, the portions where radial loads are applied tend to become worn locally. It is therefore desired to reduce such wear.

SUMMARY OF THE INVENTION

An object of the present invention is to apply a radial load to several portions along the axial direction of roller shafts rotatably supporting rollers through the rollers guiding a timing chain in rolling contact with the rollers, so as to prevent local wear from being generated in contact portions between the rollers and the roller shafts rotatably supporting the rollers.

In order to achieve the above object, the present invention provides a chain guide including a guide base configured to be arranged to extend along a portion of the outer periphery of a timing chain, the guide base being elongated in the direction in which the timing chain is moved, a plurality of roller shafts spaced from each other in the longitudinal direction of the guide base, and a plurality of chain guiding rollers rotatably supported on the respective roller shafts, each of the rollers being in the form of a roller bearing including an outer race and a plurality of roller elements received in the outer race, wherein the rollers are movable in the roller axial direction relative to both the timing chain and the roller shafts.

A chain transmission device according to the present invention includes a timing chain looped over a driving sprocket and a driven sprocket, a pivotable chain guide provided on one side of the slack side of the timing chain, and guiding movements of the timing chain, and a chain tensioner for applying adjustment force to a remote end of the chain guide remote from the center of pivoting movement of the chain guide, thereby pressing the remote end against the timing chain, wherein the chain guide is the chain guide according to the present invention.

This chain transmission device may further include a fixed chain guide provided on one side of a tight side of the timing chain, and guiding the movement of the timing chain, wherein the fixed chain guide is the chain guide according to the present invention. With this arrangement, the timing chain can be more effectively prevented from flapping.

In the chain guide according to the present invention, since the rollers in the form of the roller bearings are movable in the roller axial direction relative to the timing chain and supported so as to be movable in the axial direction relative to the roller shafts, the timing chain and the rollers are separately movable. Thus, when the chain vibrates or flaps, contact portions between the timing chain and the rollers are displaced in the axial direction, and contact portions between the rollers and the roller shafts are also displaced in the axial direction.

The contact portions between the rollers and the roller shafts are portions for supporting a radial load applied to the roller bearings from the timing chain. When the support portions move in the axial direction of the roller shafts, local wear can be suppressed and wear resistance can be improved.

The roller bearings to form the rollers may be needle roller bearings or cylindrical roller bearings. With such roller bearings, the rollers can be smoothly rotated by contact with the timing chain, so that movement resistance of the timing chain can be reduced to a large extent. The rollers can smoothly move in the axial direction of the roller shafts.

In the chain guide according to the present invention, the guide base has an opposed pair of side plate portions supporting both ends of the roller shafts, and gaps are formed between inner side surfaces of the side plate portions and end surfaces of the rollers. Thereby, an axially moving amount of the rollers can be restricted by the opposed pair of side plate portions, so that the rollers can be prevented from dropping off the roller shafts.

When the guide base is formed by molding synthetic resin, weight of the chain guide can be reduced. In this case, when polyamide 46 or polyamide 66 reinforced by glass fiber is used as the synthetic resin, the guide base has light weight, excellent oil resistance, and excellent strength with less deformation and damage due to aging.

When the roller shafts are thermally treated by bright quenching, the roller shafts are hardened so as to be excellent in durability with less wear.

In the present invention, as described above, the rollers including the roller bearings and guiding the timing chain in rolling contact with the rollers are movable relative to the timing chain and the rollers are supported to be movable in the axial direction by the roller shafts. Thereby, the contact portions between the timing chain and the rollers and the contact portions between the rollers and the roller shafts can be respectively displaced in the axial direction. Therefore, the wear locally generated on the rollers and the roller shafts can be suppressed and the wear resistance can be improved.

BRIEF DESCRIPTION OF THE DRAWINGS

FIG. 7 is an exploded front view showing a part of a guide base and the roller.
FIGS. 8(a) and 8(b) show how radial loads act.

DETAILED DESCRIPTION OF THE INVENTION

Figure 1:
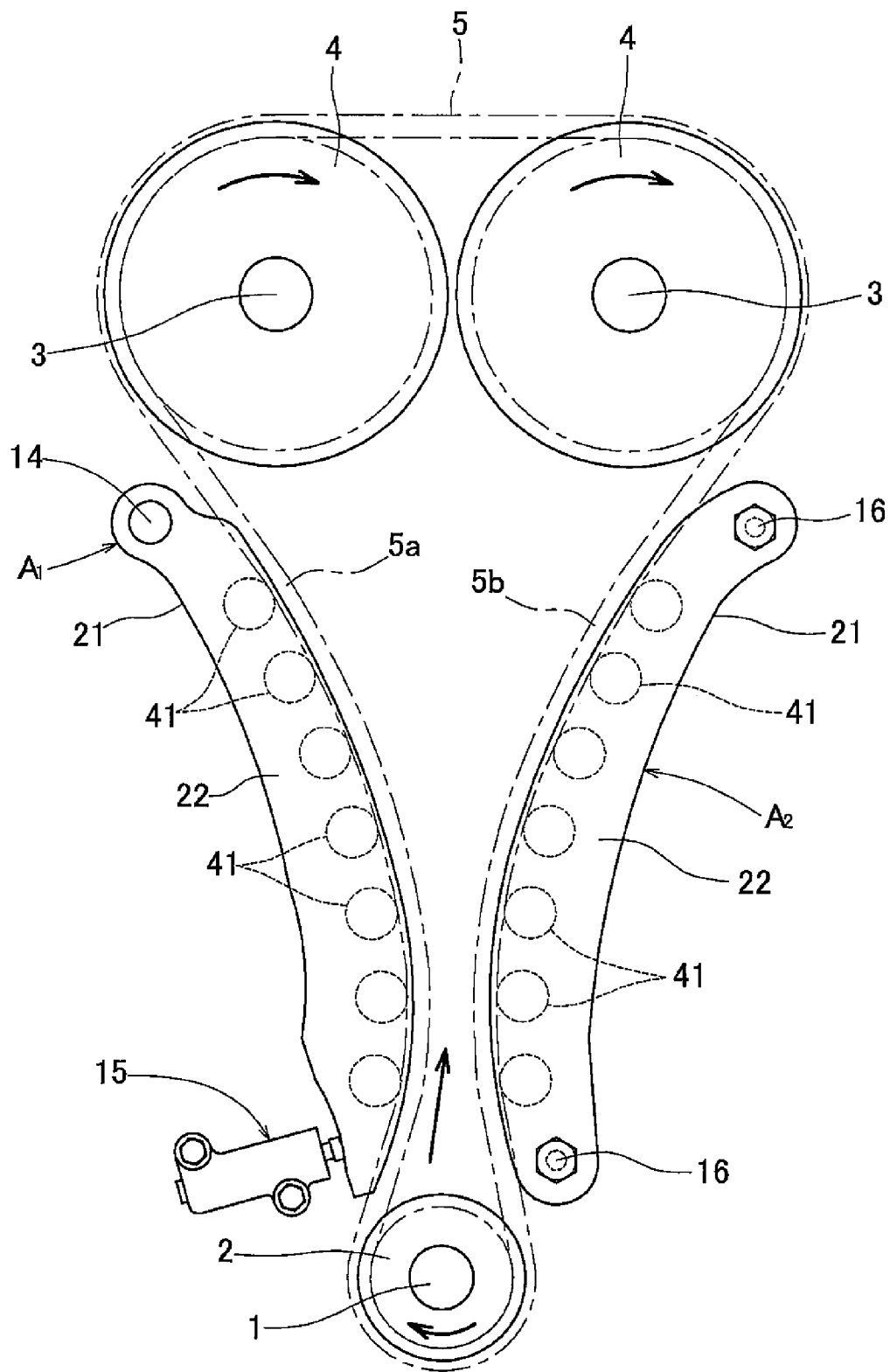
FIG. 1 schematically shows a chain transmission device embodying the present invention.

The embodiment of the present invention is now described with reference to the drawings. FIG. 1 shows a chain transmission device for driving camshafts, in which a timing chain 5 is looped over a driving sprocket 2 mounted to an end of a crankshaft 1 and driven sprockets 4 mounted to respective ends of two camshafts 3.

The timing chain 5 may be a roller chain or a silent chain.

The crankshaft 1 is rotated in the direction shown by the corresponding arrow of FIG. 1. By the rotation of the crankshaft 1, the timing chain 5 moves in the direction shown by the corresponding arrow of FIG. 1. As a result, the portion of the chain 5 extending from the driving sprocket 2 to the driven sprocket 4 on the left-hand side of FIG. 1 becomes slack (this side of the chain is thus referred to as the "slack side 5a"), and the portion of the chain extending from the other driven sprocket 4 to the driving sprocket 2 becomes tight ("tight side 5b"). A chain guide $A_1$ is provided on one side of the slack side 5a of the chain 5.

The chain guide $A_1$ is elongated in the moving direction of the timing chain 5. The chain guide $A_1$ has its upper end supported by a pivot shaft 14 protruding from an engine block so as to be pivotable about the pivot shaft 14. Adjustment force of a chain tensioner 15 is applied to the lower end, i.e. the end remote from the pivot shaft 14, of the chain guide $A_1$, so that this end of the chain guide is pressed against the slack side 5a of the chain.

A chain guide $A_2$ is provided on the opposite side of the tight side 5b of the timing chain 5. As with the pivotable chain guide $A_1$, this chain guide $A_2$ is elongated in the moving direction of the timing chain 5, with both ends thereof fixed by fastening bolts 16 screwed into the engine block, to guide the movement of the timing chain 5.

The pivotable chain guide $A_1$ and the fixed chain guide $A_2$ have the same configuration, except that the pivotable chain guide $A_1$ has at one end thereof an insertion hole 24 into which a shaft can be is inserted, whereas the fixed chain guide $A_2$ has at both ends thereof insertion holes into which bolts can be inserted.

Therefore, the configuration of only the pivotable chain guide $A_1$ will be described below. Regarding the fixed chain guide $A_2$, the same reference numerals will be given to the same parts and description thereof will be omitted.

Figure 2:
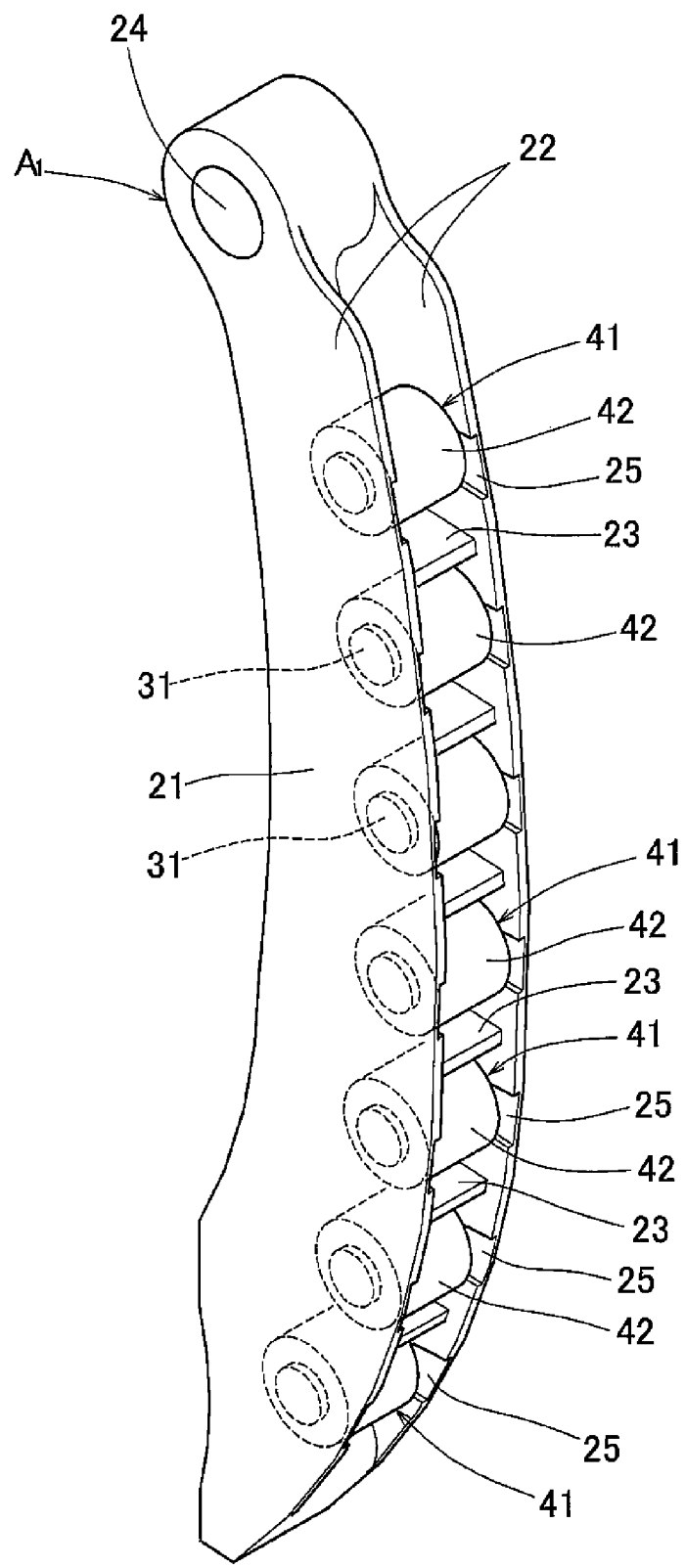
FIG. 2 is a perspective view of a chain guide according to the present invention.
Figure 3:
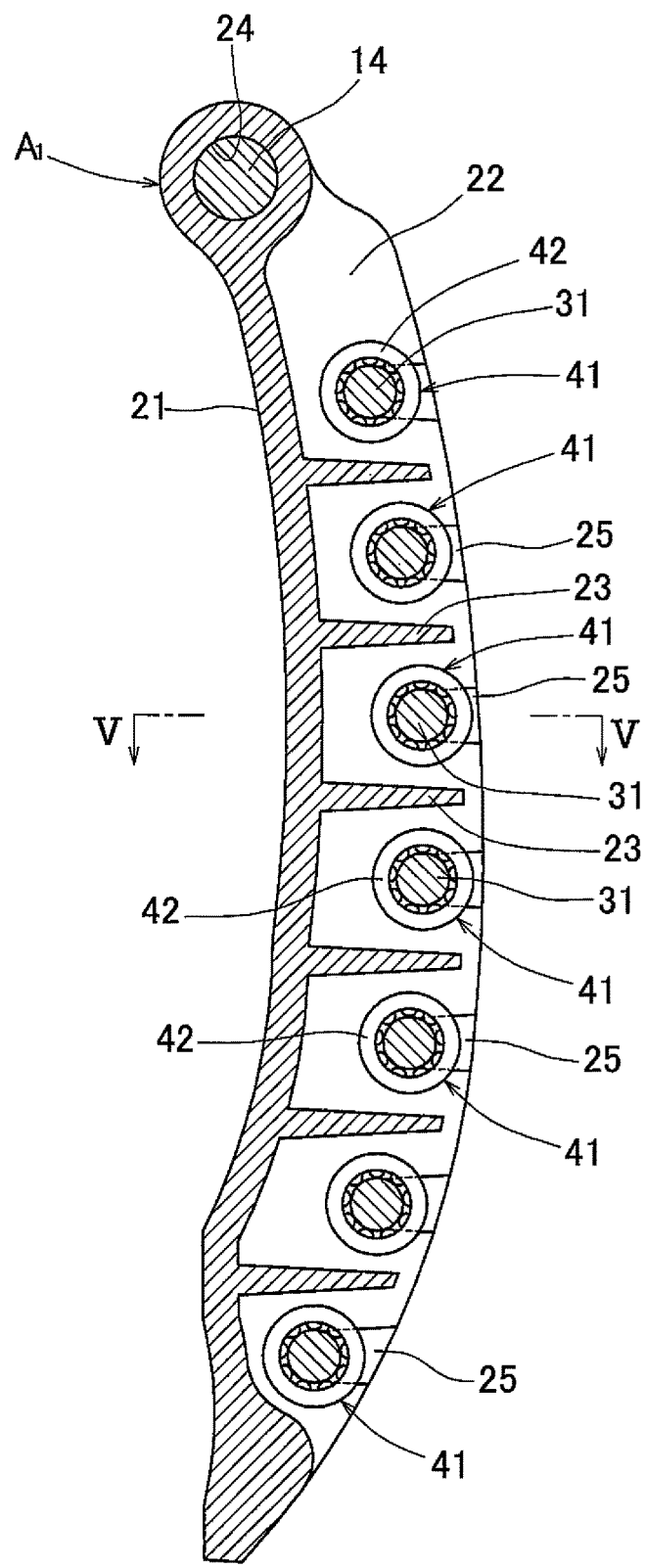
FIG. 3 is a vertically sectional view of FIG. 2.
Figure 4:
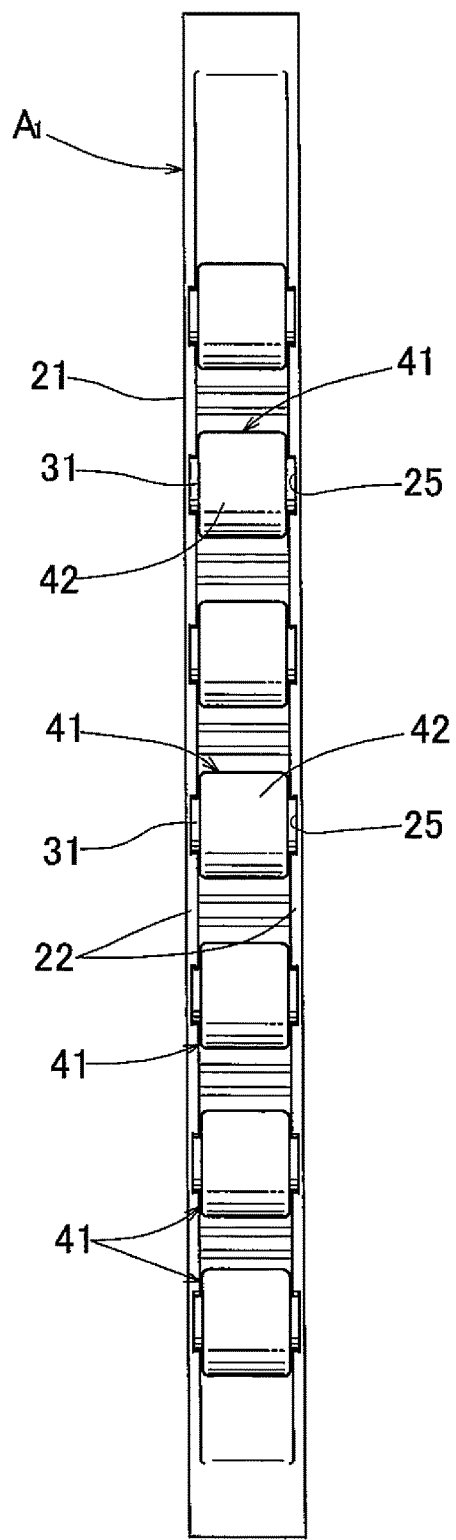
FIG. 4 is a right-hand side view of FIG. 3.

As shown in FIGS. 2 to 4, the chain guide $A_1$ includes a guide base 21 elongated in the moving direction of the timing chain 5, a plurality of roller shafts 31 spaced from each other in the longitudinal direction of the guide base 21, and a plurality of chain guiding rollers 41 rotatably supported on the respective roller shafts 31.

The guide base 21 includes an opposed pair of side plate portions 22, and a plurality of space retaining plates 23 provided between the side plate portions 22 and spaced from each other in the longitudinal direction. The side plate portions 22 are arch-shaped, and connected together at their upper ends by a portion formed with the insertion hole 24 into which the pivot shaft 14 is inserted.

A plurality of bearing recesses 25 for supporting the respective ends of the roller shafts 31 are formed in each of the opposed inner surfaces of the side plate portions 22 and spaced from each other in the longitudinal direction of the side plate portions 22.

As shown in FIG. 7, the bearing recesses 25 each include a tapered groove portion 25a extending in the width direction of the side plate portion 22 from the outer side surface of the side plate portion 22, i.e. its surface facing the timing chain 5, and having a first end open to the outer side surface and a second opposite end narrower than the first end, and a circular recess portion 25b connected to the second narrow end of the tapered groove portion 25a. The roller shafts 31 can be passed through the respective tapered groove portions 25a and fitted into and supported by the circular recess portions 25b.

This chain guide is designed to satisfy the relation $d>D_2>D_1$, where $D_1$ is the width of the second narrow ends of the tapered groove portions 25a, $D_2$ is the inner diameter of the circular recess portions 25b, and d is the outer diameter of the roller shafts 31. With this arrangement, the roller shafts 31 are fitted with interference into the circular recess portions 25b and fixed and supported so as not to be rotatable.

In the embodiment, the bearing recesses 25 are arranged such that the centers of their circular recess portions 25b lie on a convex circular arc. But they may be arranged such that the centers of their circular recess portions 25b lie on a curved line other than a convex circular arc.

The guide base 21 is formed by molding synthetic resin. As the synthetic resin, a resin excellent in oil resistance, weather resistance, and strength is preferably used. Such resins include polyamide 46 (PA 46) and polyamide 66 (PA 66). In order to further improve mechanical strength, reinforcing glass fiber is preferably mixed into the resin.

The guide base 21 may be formed by casting or die-casting a light metal such as an aluminum alloy or a magnesium alloy.

The roller shafts 31 are fitted in the respective bearing recesses 25. The roller shafts 31 are made of SUJ2 or SC material. In order to improve wear resistance, the roller shafts 31 are thermally treated to enhance hardness. As the thermal treatment, bright quenching is used in the embodiment. However, high frequency quenching or carburizing quenching may be performed instead. Alternatively, nitro-carburizing quenching may be performed.

Figure 6:
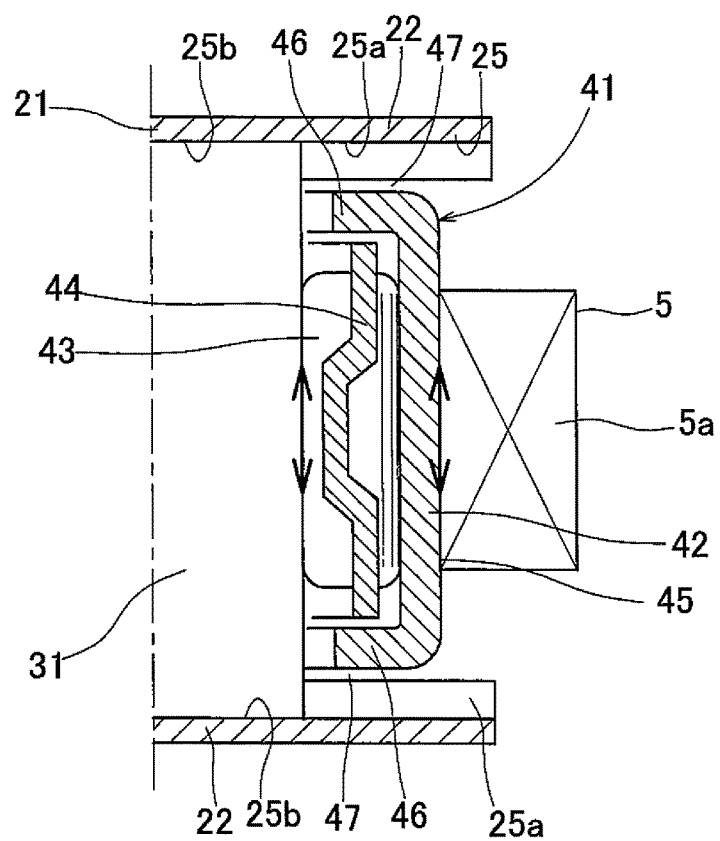
FIG. 6 is a sectional view of a roller shown in FIG. 5.

As shown in FIG. 3, the rollers 41 are rotatably supported on the respective roller shafts 31. As shown in FIG. 6, in the embodiment, needle roller bearings are used as the rollers 41. Each of the needle roller bearings includes an outer race 42, a plurality of needle roller elements 43 received in the outer race, and a retainer 44 retaining the needle roller elements 43.

The outer race 42 is a shell-shaped member formed by drawing a metal plate of SPC or SCM, and hardened by thermal treatment. In order to more easily perform drawing, the metal plate to be molded into the outer race 42 is preferably thin. However, if a thin metal plate is used, the cylindricity is lowered during thermal treatment. This may result in generation of noise while the timing chain 5 is being guided, due to contact between the outer race 42 and the timing chain 5.

In order to avoid this problem, a thick metal plate, i.e. a metal plate having a thickness of about 1 mm to 3 mm is used and drawn in the embodiment. By the drawing, a cylindrical surface 45 having the same diameter over the entire axial direction is formed on the outer periphery of the shell-shaped outer race 42. The timing chain 5, which is guided by the cylindrical surfaces 45 while kept in rolling contact with the cylindrical surfaces 45, and the needle roller bearings (rollers) 41 are movable relative to each other in the axial direction of the rollers 41.

Inwardly extending flanges 46 for retaining the retainer 44 are formed at both ends of the shell-shaped outer race 42. In order to more easily install the needle roller bearing 41, the inwardly extending flanges 46 are formed by bending after mounting the retainer 44 for retaining the needle roller elements 43.

Figure 5:
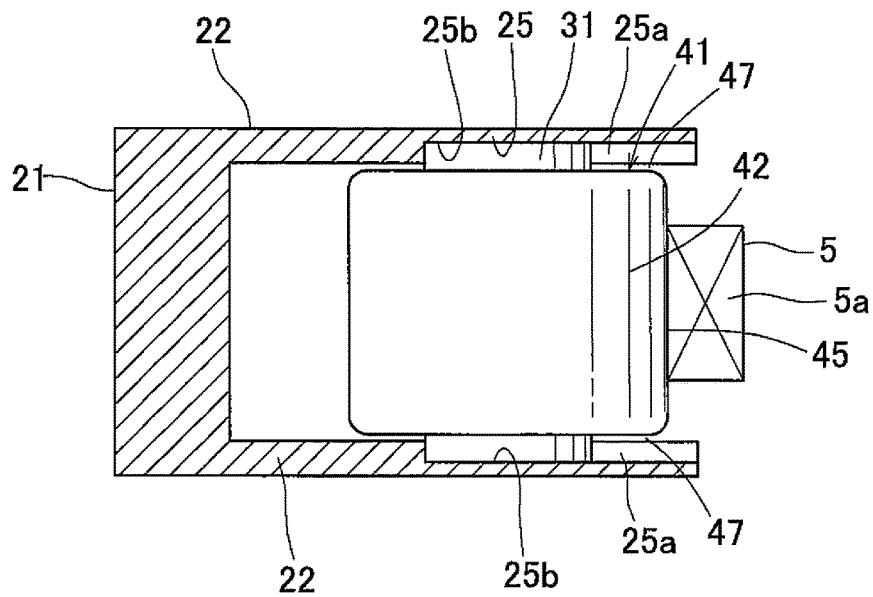
FIG. 5 is a sectional view taken along line V-V of FIG. 3.

The needle roller bearings 41 are supported on the respective roller shafts 31 so as to be movable in the axial direction thereof relative to the roller shafts 31. As shown in FIGS. 5 and 6, gaps 47 are defined between the end surfaces of the needle roller bearings 41 and the inner side surfaces of the respective side plate portions 22 of the guide base 21. The needle roller bearings 41 are movable within the range of the gaps 47.

Figure 9:
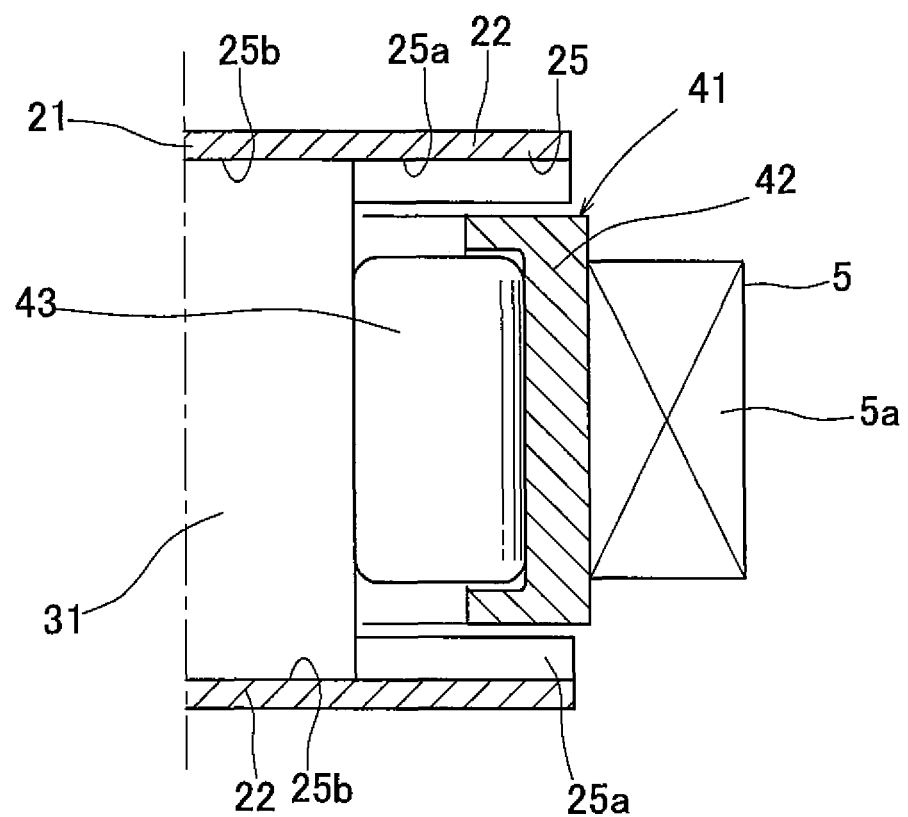
FIG. 9 is a sectional view of a different roller.

As shown in FIG. 9, cylindrical roller bearings 41 may be used in place of the needle roller bearings. In either case, the roller bearings may be full type roller bearings, i.e. bearings without a retainer. In FIG. 9, the reference numeral 42 denotes an outer race of the cylindrical roller bearing 41, and the reference numeral 43 denotes a cylindrical roller element.

Now the operation of the chain transmission device shown in the embodiment is described. While the rotation of the crankshaft 1 is being transmitted to the camshafts 3 by the movement of the timing chain 5 looped over the driving sprocket 2 and the driven sprockets 4, the chain tensioner 15 absorbs fluctuations in tension of the timing chain 5 due to fluctuations in loads applied, thereby preventing the timing chain 5 from becoming slack and flapping.

While torque (rotation) of the crankshaft 1 is being transmitted to the camshafts 3, the respective rollers 41, which are needle roller bearings, of the pivotable chain guide $A_1$ and the fixed chain guide $A_2$ are rotated by contact with the timing chain 5, so that the timing chain 5 is guided while being in rolling contact with the rollers.

Therefore, movement resistance of the timing chain 5 is small, so that the timing chain 5 smoothly moves and the torque is transmitted without a loss.

Since the respective rollers 41 of the chain guide $A_1$ and the fixed chain guide $A_2$ are rotated by the contact with the timing chain 5 as described above, contact portions between the rollers 41 and the roller shafts 31 receive radial loads.

If the rollers 41 are supported so as not to be movable in the axial direction relative to the timing chain 5 and the rollers 41 are supported so as not to be movable in the axial direction relative to the roller shafts 31, radial loads F are applied to a fixed portion as shown in FIG. 8(*a*), so that the rollers 41 and the roller shaft 31 tend to become worn locally at the fixed portion.

But in the arrangement of the embodiment, since the outer peripheries of the rollers 41 have cylindrical surfaces 45 having the same diameter over the entire axial direction, the rollers 41 and the timing chain 5 are movable relative to each other in the axial direction, and the rollers 41 are supported to be movable in the axial direction by the roller shafts 31. Thus, the rollers 41 and the timing chain 5 move relative to each other in the axial direction, and the rollers 41 move relative to the roller shafts 31 in the axial direction of the roller shafts 31, by e.g. vibration of the timing chain 5. By those relative movements, radial loads F are applied to different portions along the axial direction of the roller shafts 31 as shown in FIG. 8(*b*). This prevents local wear of the rollers 41 and the roller shafts 31.

The invention claimed is:

1. A chain guide comprising:
  a guide base configured to be arranged to extend along a portion of an outer periphery of a timing chain, the guide base being elongated in a direction in which the timing chain is moved;
  a plurality of roller shafts mounted in the guide base so as to be spaced from each other in a longitudinal direction of the guide base; and
  a plurality of chain guiding rollers rotatably supported on the respective roller shafts;
  wherein the guide base has an opposed pair of side plate portions supporting ends of the roller shafts on respective sides of the roller shafts, and wherein gaps are defined between inner side surfaces of the side plate portions and each of end surfaces of the rollers such that the rollers are movable in a roller axial direction;
  wherein the rollers are movable in the roller axial direction so as to be movable relative to both the timing chain and the roller shafts;
  wherein each of the rollers is constituted by a needle roller bearing comprising an outer race, needle roller elements received in the outer race, and a retainer retaining the needle roller elements;
  wherein the outer race of each of the needle roller bearings is constituted by a metal shell member having a radially outwardly-facing metal cylindrical surface that is an outermost peripheral surface of the metal shell member;
  wherein, for each of the metal shell members, the radially outwardly-facing metal cylindrical surface has a constant outer diameter from a first terminal end of the metal shell member to a second terminal end of the metal shell member in the roller axial direction;
  wherein each of the metal shell members includes radially inwardly extending flanges which extend inwardly in a roller radial direction from two respective ends of the corresponding outer race;
  wherein the outer races are configured and arranged such that, with the timing chain extended along the guide base, the timing chain is in direct rolling contact against the radially outwardly-facing metal cylindrical surfaces of the metal shell members such that the timing chain is directly guided by the radially outwardly-facing metal cylindrical surfaces of the metal shell members; and
  wherein, in a plane intersecting the timing chain, each of the side plate portions of the guide base protrudes further in the roller radial direction toward the timing chain than the radially outwardly-facing metal cylindrical surfaces.

2. The chain guide according to claim 1, wherein the guide base is formed by molding synthetic resin.

3. The chain guide according to claim 2, wherein the synthetic resin comprises polyamide 46 or polyamide 66 reinforced by glass fiber.

4. The chain guide according to claim 1, wherein the roller shafts are thermally treated by bright quenching.

5. A chain transmission device comprising:
a timing chain looped over a driving sprocket and a driven sprocket;
a pivotable chain guide provided on one side of a slack side of the timing chain, and guiding movements of the timing chain; and
a chain tensioner for applying adjustment force to a remote end of the chain guide remote from a center of pivoting movement of the chain guide, thereby pressing the remote end against the timing chain,
wherein the chain guide comprises the chain guide according to claim 1.

6. A chain transmission device comprising:
a timing chain looped over a driving sprocket and a driven sprocket;
a pivotable chain guide provided on one side of a slack side of the timing chain, and guiding movements of the timing chain;
a fixed chain guide provided on one side of a tight side of the timing chain, and guiding movements of the timing chain;
a chain tensioner for applying adjustment force to a remote end of the pivotable chain guide remote from a center of pivoting movement of the pivotable chain guide, thereby pressing the remote end against the timing chain,
wherein each of the fixed chain guide and the pivotable chain guide is constituted by a chain guide according to claim 5.

7. The chain guide according to claim 5, wherein each of the metal shell members is constituted by a thermally-hardened drawn metal plate.

* * * * *